United States Patent
Merlo et al.

(10) Patent No.: US 10,040,875 B2
(45) Date of Patent: Aug. 7, 2018

(54) LIQUID COMPOSITIONS OF FLUORINATED ION EXCHANGE POLYMERS

(75) Inventors: Luca Merlo, Montorfano (IT); Claudio Oldani, Nerviano (IT); Vincenzo Arcella, Nerviano (IT)

(73) Assignee: SOLVAY SPECIALTY POLYMERS ITALY S.P.A., Bollate (Milan) (IT)

(*) Notice: Subject to any disclaimer, the term of this patent is extended or adjusted under 35 U.S.C. 154(b) by 471 days.

(21) Appl. No.: 13/988,746

(22) PCT Filed: Nov. 17, 2011

(86) PCT No.: PCT/EP2011/070383
§ 371 (c)(1),
(2), (4) Date: May 21, 2013

(87) PCT Pub. No.: WO2012/069360
PCT Pub. Date: May 31, 2012

(65) Prior Publication Data
US 2013/0244138 A1    Sep. 19, 2013

(30) Foreign Application Priority Data
Nov. 26, 2010   (EP) ..................... 10192731

(51) Int. Cl.
| | | |
|---|---|---|
| H01M 8/02 | (2016.01) |
| C08F 14/04 | (2006.01) |
| C08F 8/12 | (2006.01) |
| C08F 214/18 | (2006.01) |
| C08J 3/09 | (2006.01) |
| C08J 3/11 | (2006.01) |
| C08J 5/22 | (2006.01) |
| H01M 8/1023 | (2016.01) |
| H01M 8/1039 | (2016.01) |
| H01M 8/0289 | (2016.01) |
| C08F 214/24 | (2006.01) |
| C08F 216/14 | (2006.01) |

(52) U.S. Cl.
CPC ........... *C08F 14/04* (2013.01); *C08F 8/12* (2013.01); *C08F 214/18* (2013.01); *C08J 3/09* (2013.01); *C08J 3/091* (2013.01); *C08J 3/11* (2013.01); *C08J 5/2237* (2013.01); *H01M 8/0289* (2013.01); *H01M 8/1023* (2013.01); *H01M 8/1039* (2013.01); *C08F 214/242* (2013.01); *C08F 216/1408* (2013.01); *C08J 2327/02* (2013.01); *C08J 2327/18* (2013.01)

(58) Field of Classification Search
CPC ........................................ H01M 8/02
USPC ............... 521/28, 27, 38; 429/400–535
See application file for complete search history.

(56) References Cited

U.S. PATENT DOCUMENTS

| | | | |
|---|---|---|---|
| 3,902,947 A | 9/1975 | Grot | |
| 4,433,082 A | 2/1984 | Grot | |
| 4,465,533 A | 8/1984 | Covitch | |
| 4,804,727 A | 2/1989 | Ezzell et al. | |
| 4,940,525 A * | 7/1990 | Ezzell et al. .................. 204/252 |
| 6,150,426 A | 11/2000 | Curtin et al. | |
| 6,179,132 B1 | 1/2001 | Moya | |
| 2003/0215719 A1* | 11/2003 | Navarrini ............... C08J 5/2237 429/316 |
| 2005/0130006 A1* | 6/2005 | Hoshi ..................... C08F 16/30 429/442 |
| 2005/0153187 A1* | 7/2005 | Chiba ................. H01M 8/1044 429/482 |
| 2006/0286435 A1* | 12/2006 | Kourtakis ...................... 429/44 |
| 2007/0066691 A1* | 3/2007 | Arcella ............. B01D 67/0013 521/27 |
| 2008/0166601 A1* | 7/2008 | Honmura .............. H01M 4/926 429/413 |
| 2009/0053576 A1 | 2/2009 | Wu | |
| 2009/0169949 A1* | 7/2009 | Hicks .................. H01M 4/8828 429/483 |

FOREIGN PATENT DOCUMENTS

| | | |
|---|---|---|
| EP | 0382703 A2 | 8/1990 |
| EP | 1004615 A2 | 5/2000 |
| EP | 1167400 A1 | 1/2002 |

(Continued)

OTHER PUBLICATIONS

First Office action to Chinese Application CN201180056731 dated Mar. 24, 2014.*
Decision_to_Grant_a_Patent(Translated),Jul. 15, 2016.*
Sauguet, L., et al—"Fluorinated Copolymers and Terpolymers Based on Vinylidene Fluoride and Bearing Sulfonic Acid Side-Group", 2007, Journal of Polymer Science—Part A—Polymer Chemistry, vol. 45, pp. 1814-1834; 21 pgs.

*Primary Examiner* — Alex Usyatinsky

(57) ABSTRACT

A liquid composition comprising at least one aprotic organic solvent and at least one fluorinated ion exchange polymer which consists of recurring units derived from a chlorofluoroolefin of formula $CF_2=CClY$, wherein Y is F or Cl, and from at least one fluorinated functional monomer selected among those of formula $CF_2=CF-O-(CF_2CF(CF_3)O)_m-(CF_2)_nSO_2X$, wherein m is an integer equal to 0 or 1, n is an integer from 0 to 10 and X is chosen among halogens (Cl, F, Br, I), $-O^-M^+$, wherein $M^+$ is a cation selected among $H^+$, $NH_4^+$, $K^+$, $Li^+$, $Na^+$, or mixtures thereof is disclosed. The liquid composition is suitable for the preparation of ion exchange membranes, in particular composite membranes, for use in fuel cell applications.

16 Claims, No Drawings

(56) References Cited

FOREIGN PATENT DOCUMENTS

| | | |
|---|---|---|
| EP | 1285688 A1 | 2/2003 |
| EP | 1323744 A1 | 7/2003 |
| EP | 1403958 A1 | 3/2004 |
| EP | 1589062 A2 | 10/2005 |
| EP | 1811219 A1 | 7/2007 |
| EP | 1911796 A1 | 4/2008 |
| EP | 2 062 933 A1 | 5/2009 |
| GB | 1286859 A | 8/1972 |
| JP | S 52-5687 | 1/1977 |
| JP | S 62-501079 | 4/1987 |
| WO | 86/07075 | 12/1986 |
| WO | WO 9820573 A1 | 5/1998 |
| WO | WO 00/24709 * | 5/2000 |
| WO | WO 0024709 A2 | 5/2000 |

* cited by examiner

LIQUID COMPOSITIONS OF FLUORINATED ION EXCHANGE POLYMERS

This application claims priority to European application No. 10192731.7 filed on 26 Nov. 2010, the whole content of this application being incorporated herein by reference for all purposes.

TECHNICAL FIELD

The invention relates to fluorinated ion exchange polymer liquid compositions, to the fluorinated ion exchange polymers suitable to prepare said liquid compositions, to a process for manufacturing said liquid compositions, to their use for the manufacture of membranes and to the membranes obtained therefrom.

BACKGROUND ART

Liquid compositions of fluorinated ion exchange polymers are known for use in the manufacture of ion exchange membranes, for membrane coatings containing conductive and non-conductive particles, and for many other uses. While such compositions are sometimes referred to as solutions, the compositions are generally recognized as being dispersions (i.e. colloidal suspensions) of polymer particles.

GB 1286859 (DU PONT DE NEMOURS) 23 Aug. 1972 discloses solutions of (per)fluorinated ion exchange polymers comprising sulfonate, sulfonamide or sulfonic acid groups in an organic solvent. The (per)fluorinated ion exchange polymers contain at least 14 mole % of monomer units which contain the sulfonate, sulfonamide or sulfonic acid groups. The organic solvent is at least 5% by weight soluble in water and is selected from $C_1$-$C_4$ alcohols, fluorocarbon alcohols, organic amides, acetone and preferably has a boiling point lower than 130° C. The reported concentration of the polymer in organic solvents other than alcohols is very low, around 1% by weight.

U.S. Pat. No. 4,433,082 (DUPONT DE NEMOURS) 21 Dec. 1984 discloses a process for dissolving (per)fluorinated ion exchange polymers having —$SO_3M$ functional groups (wherein M is H, Na, K, $NR_4$) having an equivalent weight in the range of 1025-1500 g/eq in an aqueous-alcoholic liquid medium. The preferred medium is a mixture of 20-90% by weight of water and 10-80% by weight of an alcohol ($C_1$-$C_4$) optionally in the presence of other solvents miscible in water. The process is carried out at a temperature of from 180 to 300° C. in a closed vessel obtaining two liquid phases having a different density which are separated.

EP 1004615 A (AUSIMONT SPA) 31 May 2000 discloses a process to prepare a solution and/or dispersion containing (per)fluorinated ion exchange polymers comprising —$SO_3M$ functional groups (wherein M is H, Li, Na, K, $NR_4$) in a monophasic ternary mixture comprising 0.1%-50% by weight water, 50%-99% by weight of a $C_1$-$C_4$ alcohol and 0.1%-40% by weight of a fluoro(poly)oxyalkylene having one hydrogen atom in at least one fluorinated end group. The process is carried out at a temperature comprised between room temperature and 150° C.

In all of these documents alcohol-based liquid phases are used for the preparation of concentrated solutions. The use of alcohol-based liquid compositions is however undesirable for some applications. For example, when the (per)fluorinated ion exchange polymer is used as a binder for the preparation of catalyst-containing electrodes residual traces of alcohols may cause side reactions and may even represent a fire hazard. Also, alcohol-based liquid compositions of (per)fluorinated ion exchange polymers are generally characterized by a high viscosity that renders them difficult to use in the preparation of membranes, for instance by impregnation of porous substrates.

Alcohol-free liquid compositions comprising fluorinated ion exchange polymers, namely aqueous liquid compositions comprising up to 10% by weight of a (per)fluorinated ion exchange polymer having an equivalent weight in the range of 1025-1500 g/eq were disclosed in U.S. Pat. No. 4,433,082 (DUPONT DE NEMOURS) 21 Dec. 1984. U.S. Pat. No. 6,150,426 (DU PONT DE NEMOURS) 21 Nov. 2000 also discloses liquid compositions containing either an aqueous liquid medium or a non-aqueous liquid medium with 0.5 to 50% by weight of a (per)fluorinated ion exchange polymer having well defined solid particle size distribution, said compositions being substantially free of water miscible alcohols. The aqueous liquid compositions are obtained by means of a dissolution process at temperatures between 150 and 350° C. in a pressurized vessel, in the presence of water or, optionally in the presence of water and from 0.5 to 75% by weight of a water immiscible organic solvent which separates from the liquid composition at the end of the process. The non-aqueous liquid compositions are obtained by re-dispersion of the solids obtained by drying the aqueous liquid composition of the ion exchange polymer.

Water-based liquid compositions are generally unsuitable for the preparation of composite membranes, for instance by coating or impregnation of a porous support due to their reduced ability to wet surfaces, in particular fluorinated surfaces.

Thus, a need still exists for liquid compositions comprising a sufficiently high concentration of a fluorinated ion exchange polymer in organic solvents other than alcohols that can be prepared without requiring the use of high pressures and temperatures. In particular, a need still exists for liquid compositions having an appropriate balance between the concentration of the fluorinated ion exchange polymer, the viscosity of the liquid composition and its surface tension to be suitably employed for the preparation of composite membranes.

SUMMARY OF INVENTION

It has now been found that liquid compositions of a fluorinated ion exchange polymer in aprotic organic solvents which are suitable for the preparation of ion exchange membranes can be obtained with a dissolution process carried out under mild conditions of pressure and temperature when the fluorinated ion exchange polymer consists of:
- 40 to 94 mol % of recurring units derived from a chlorofluoroolefin of formula $CF_2$=CClY, wherein Y is either F or Cl, and
- from 6 to 60 mol % of recurring units derived from at least one functional monomer of formula $CF_2$=CF—O—$(CF_2CF(CF_3)O)_m$—$(CF_2)_n SO_2X$.

The Applicant has surprisingly found that with respect to the corresponding polymers comprising recurring units derived from tetrafluoroethylene, ion exchange polymers comprising recurring units derived from chlorofluoroolefins of formula $CF_2$=CClY, wherein Y is either F or Cl, are more readily soluble in aprotic organic solvents.

The liquid compositions thus obtained can be used for the preparation of ion exchange membranes, in particular proton exchange membranes for fuel cell applications. When the liquid composition comprises the fluorinated ion exchange polymer in its acid form, proton exchange membranes are obtained that do not require any further activation treatment.

The Applicant has found that said membranes are characterised by good ion conductivity, low permeability to gases (e.g. hydrogen) and, unexpectedly, by a high stability at the conditions of operation of a fuel cell.

Ion exchange polymers comprising recurring units deriving from CTFE and from fluorinated monomers comprising cation exchange groups —$SO_2F$ have been disclosed for instance in SAUGUET, L., et al. Fluorinated Copolymers and Terpolymers Based on Vinylidene Fluoride and Bearing Sulfonic acid Side-Group. *Journal of Polymer Science-Part A-Polymer Chemistry*: (A) *J. Polym. Sci., A, Polym. Chem.* 2007, vol. 45, p. 1814-1834. which discloses copolymers consisting of recurring units deriving from CTFE and $CF_2=CF(OCF_2C(CF_3)F)O(CF_2)_2SO_2F$ as well as terpolymers comprising vinylidene fluoride in addition to the other monomers. The $CTFE/CF_2=CF(OCF_2CF(CF_3))O(CF_2)_2 SO_2F$ copolymers described therein, comprising 2.5 mol % of the sulfonyl fluoride containing monomer, are described as insoluble in organic solvents.

US 2009/0053576 (WU) 26 Feb. 2009 relates to fluorochloroionomers having an equivalent weight between 600 and 1500 and a chlorine content between 8 and 30% wt. Copolymers consisting of recurring units derived from CTFE and $CF_2=CF(OCF_2CF(CF_3))O(CF_2)_2SO_2F$ are described without any mention of their solubility in organic solvents nor of their molar composition.

DESCRIPTION OF INVENTION

A first object of the present invention is a liquid composition comprising at least one aprotic organic solvent and at least one fluorinated ion exchange polymer which consists of:
  40 to 94 mol % of recurring units derived from a chlorofluoroolefin of formula $CF_2=CCIY$, wherein Y is either F or Cl, and
  from 6 to 60 mol % of recurring units derived from at least one functional monomer of formula $CF_2=CF—O—(CF_2CF(CF_3)O)_m—(CF_2)_nSO_2X$, wherein m is an integer equal to 0 or 1, n is an integer from 0 to 10 and X is chosen among halogens (Cl, F, Br, I), —$O^-M^+$, wherein $M^+$ is a cation selected among $H^+$, $NH_4^+$, $K^+$, $Li^+$, $Na^+$, or mixtures thereof.

The term fluorinated is used herein to refer to compounds (e.g. monomers, polymers etc.) that are totally free of hydrogen atoms, i.e. wherein all the hydrogen atoms have been replaced by fluorine atoms and/or chlorine atoms, in the units deriving from the chlorofluoroolefin.

In general the liquid composition contains the fluorinated ion exchange polymer in an amount of at least 5 wt %, with respect to the total weight of the liquid composition. Typically, the amount of fluorinated ion exchange polymer in the liquid composition is at least 6 wt %, preferably at least 8 wt %, more preferably at least 10 wt %, even more preferably at least 12 wt % with respect to the total weight of the liquid composition. Typically, the amount of fluorinated ion exchange polymer in the liquid composition does not exceed 60 wt %, preferably it does not exceed 50 wt %, more preferably it does not exceed 45 wt % with respect to the total weight of the liquid composition. When the amount of the fluorinated ion exchange polymer in the composition exceeds 60 wt % the viscosity of the composition is generally too high to prepare membranes e.g. by means of a casting, coating or impregnation process. On the other hand, if the amount of the fluorinated ion exchange polymer in the composition is less than 5 wt % the amount of polymer deposited on a given substrate is generally too low to provide a continuous membrane of uniform thickness. In such a case a high number of sequential deposition steps, for instance by coating, casting or impregnation, may be required to obtain a membrane of the desired thickness.

The liquid composition comprises the fluorinated ion exchange polymer under dissolved or dispersed form. The term "dissolved form" is intended to denote a "true" solution of the fluorinated ion exchange polymer. The wording "dispersed form" is hereby intended to denote a colloidal suspension of the fluorinated ion exchange polymer, whereby particles of fluorinated ion exchange polymer of average particle size of generally less than 500 nm are stably suspended with no settlement phenomena when left in unperturbed state.

In case of dispersed form, the fluorinated ion exchange polymer advantageously possesses an average particle size of 1 to 500 nm, preferably of 1 to 250 nm, even more preferably from 1 to 100 nm.

In a first embodiment, the liquid composition comprises the fluorinated ion exchange polymer having the functional groups —$SO_2X$ in their acid or salified form, that is having functional groups —$SO_2X$ wherein $X=O^-M^+$ and $M^+$ is a cation selected among $H^+$, $NH_4^+$, $K^+$, $Li^+$, $Na^+$, or mixtures thereof. Preferably, $M^+$ is a cation selected among $H^+$, $NH_4^+$, $K^+$, $Na^+$. More preferably, the liquid composition comprises the fluorinated ion exchange polymer having the functional groups —$SO_2X$ in their acid form, that is wherein $X=O^-M^+$ and $M^+$ is $H^+$. Said liquid compositions are particularly advantageous as they allow preparing proton exchange membranes which can be used directly in a fuel cell without any additional activation step. The expressions "acid form" and/or "salified form" are meant to indicate that substantially all the ion exchange groups in the polymer are protonated ($M^+=H^+$) and/or neutralized ($M^+=NH_4^+$, $K^+$, $Li^+$, $Na^+$).

In a second embodiment the liquid composition comprises the fluorinated ion exchange polymer having the functional groups —$SO_2X$ in their neutral form, that is having functional groups —$SO_2X$ wherein X is selected among halogens F, Cl, Br, I. Preferably, the liquid composition comprises the fluorinated ion exchange polymer having functional groups —$SO_2X$ wherein $X=F$.

In addition to the fluorinated ion exchange polymer the liquid composition further comprises an aprotic organic solvent. The expression "aprotic organic solvent" is intended to denote an organic solvent which does not comprise acidic hydrogen atoms. In the remainder of the text the expression is understood, for the purposes of the present invention, both in the singular and the plural, in that more than one aprotic organic solvent can be used at any one time.

The aprotic organic solvent can be either apolar or polar. Mixtures of polar and apolar aprotic organic solvents can also be used.

The aprotic organic solvent is preferably selected among those having a boiling temperature of at least 50° C., preferably of at least 60° C.

Liquid compositions comprising apolar aprotic organic solvents can be advantageously obtained when the fluorinated ion exchange polymer comprises functional groups —$SO_2X$ in their neutral form, that is when X is chosen among halogens (F, Cl, Br, I), preferably when $X=F$.

Among suitable apolar organic solvents, mention can be notably made of fluorinated aliphatic and aromatic compounds, e.g. perfluorohexane, perfluorooctane, hexafluorobenzene, hydrofluoroethers such as those of formula $C_3F_7OCH_3$, $C_4F_9OCH_3$, $C_4F_9OC_2H_5$, $C_7F_{15}OC_2H_5$, hydrofluoropolyethers such as those available from Solvay Solexis S.p.A. under the tradenames H-GALDEN® ZT 60, H-GALDEN® ZT 85, H-GALDEN® ZT 100, H-GALDEN® ZT 130, H-GALDEN® ZT 150, H-GALDEN® ZT 180.

Liquid compositions comprising polar organic solvents can be advantageously obtained when the fluorinated ion exchange polymer comprises functional groups —$SO_2X$ in their acid or salified form, that is when X is —$O^-M+$ and $M^+$ is a cation selected among $H^+$, $NH_4^+$, $K^+$, $Li^+$, $Na^+$, or mixtures thereof. Preferably, $M^+$ is a cation selected among $H^+$, $NH_4^+$, $K^+$, $Na^+$.

Among polar aprotic organic solvents suitable for the liquid composition of the present invention, mention can be notably made of ketones, like acetone, methyethylketone, esters, like methylacetate, dimethylcarbonate, diethylcarbonate, ethylacetate, nitriles, like acetonitrile, sulphoxides, like dimethylsulfoxide, amides, like N,N-dimethylformamide, N,N-dimethylacetamide, pyrrolidones, like N-methylpyrrolidone, N-ethylpyrrolidone.

Preferred polar aprotic organic solvents are selected from the group consisting of sulphoxides, like dimethylsulfoxide, amides, like N,N-dimethylformamide, N,N-dimethylacetamide, pyrrolidones, like N-methylpyrrolidone, N-ethylpyrrolidone. Advantageous is the use of pyrrolidones, like N-methylpyrrolidone, N-ethylpyrrolidone, optionally in the presence of ketones or nitriles.

Typically, suitable polar aprotic organic solvents are characterized by having a boiling temperature of 150° C. or more, preferably of 160° C. or more.

The liquid composition may optionally comprise additional ingredients. Mention can be made of non-ionic surfactants like TRITON® surfactant, TERGITOL® surfactant; as well as thermoplastic fluoropolymers, typically having film-forming properties. Among thermoplastic fluoropolymers which can be used in combination with the fluorinated ion exchange polymer in the liquid composition, mention can be made of PFA, ETFE, PCTFE, PDVF, ECTFE, and the like.

In an embodiment of the invention the liquid composition further comprises a bis-olefin and a radical initiator in addition to the fluorinated ion exchange polymer. Non limiting examples of suitable bis-olefins are selected form those of formulae below:

$R_1R_2C$=CH—$(CF_2)_j$—CH=$CR_3R_4$ wherein j is an integer between 2 and 10, preferably between 4 and 8, and $R_1$, $R_2$, $R_3$, $R_4$, equal or different from each other, are —H, —F or $C_1$-$C_5$ alkyl or (per)fluoroalkyl group;

$A_2C$=CB—O—E—O—CB=$CA_2$, wherein each of A, equal or different from each other, is independently selected from —F, —Cl, and —H; each of B, equal or different from each other is independently selected from —F, —Cl, —H and —$OR_B$, wherein $R_B$ is a branched or straight chain alkyl radical which can be partially, substantially or completely fluorinated or chlorinated; E is a divalent group having 2 to 10 carbon atoms, optionally fluorinated, which may be inserted with ether linkages; preferably E is a —$(CF_2)_z$— group, with z being an integer from 3 to 5; a preferred bis-olefin is $F_2C$=CF—O—$(CF_2)_5$—O—CF=$CF_2$;

$R_6R_7C$=$CR_5$-E-O—CB=$CA_2$, wherein E, A and B have the same meaning as above defined; $R_5$, $R_6$, $R_7$, equal or different from each other, are —H, —F or $C_1$-$C_5$ alkyl or (per)fluoroalkyl group.

Non-limiting examples of suitable radical initiators are azo-compounds, such as 2,2' azo-bis-isobutyronitrile (AIBN), azo-bis-diphenylmethane and tetrazenes; organic and inorganic peroxides (i.e. dialkyl and diacyl peroxides) and hydroperoxides (i.e. tert-butyl hydroperoxide). Among the most commonly used peroxides mention can be made of dialkylperoxides as, for example, di-terbutyl-peroxide and 2,5-dimethyl-2,5-di (terbutylperoxy) hexane; dicumyl peroxide; dibenzoyl peroxide; diterbutyl perbenzoate; di[1,3-dimethyl-3-(terbutylperoxy) butyl]-carbonate. Additionally, redox systems, such as compositions comprising hydrogen peroxide and soluble iron salts, could be used.

When a bis-olefin is employed, the liquid composition typically comprises from 0.01% to 5 mol % of the bis-olefin with respect to the total amount of the fluorinated ion exchange polymer. The radical initiator is typically present in an amount of from 0.5 wt % to 6 wt % referred to the fluorinated ion exchange polymer in the liquid composition.

Liquid compositions comprising a bis-olefin and a radical initiator may advantageously be used for the preparation of cross-linked membranes. Cross-linking is typically promoted by heat-treatment or UV irradiation.

The fluorinated ion exchange polymer used in the inventive liquid composition consists of:
40 to 94 mol % of recurring units derived from a chlorofluoroolefin of formula $CF_2$=CCIY, wherein Y is either F or Cl, and
from 6 to 60 mol % of recurring units derived from at least one functional monomer of formula $CF_2$=CF—O—$(CF_2CF(CF_3)O)_m$—$(CF_2)_n SO_2X$, wherein m is an integer equal to 0 or 1, n is an integer from 0 to 10 and X is chosen among halogens (Cl, F, Br, I), —$O^-M^+$, wherein $M^+$ is a cation selected among $H^+$, $NH_4^+$, $K^+$, $Li^+$, $Na^+$, or mixtures thereof.

In the remainder of the text the expression "fluorinated functional monomer" is understood, for the purposes of the present invention, both in the singular and the plural, in that more than one fluorinated functional monomer as defined above can be used at any one time.

The amount of recurring units derived from the fluorinated functional monomer of formula $CF_2$=CF—O—$(CF_2CF(CF_3)O)_m$—$(CF_2)_n SO_2X$ in the fluorinated ion exchange polymer is at least 6 mol %, preferably is at least 7 mol %, more preferably is at least 8 mol %. Typically the amount of recurring units derived from the fluorinated functional monomer does not exceed 60 mol %, preferably it does not exceed 55 mol %, more preferably it does not exceed 50 mol %, even more preferably it does not exceed 45 mol %.

When the amount of recurring units derived from the fluorinated functional monomer in the fluorinated ion exchange polymer is at least 6 mol %, liquid compositions can be prepared having a concentration of the polymer exceeding 5 wt % at low temperatures and with low dissolution times. It has been observed that when the amount of the fluorinated functional monomer increases, more concentrated liquid compositions can be prepared without increasing the temperature and/or time of the dissolution process.

The amount of recurring units derived from the chlorofluoroolefin of formula $CF_2$=CCIY is preferably the complement to 100 mol % with respect to the amount of units derived from the fluorinated functional monomer. Small amounts, typically not greater than 3%, more typically not greater than 2 mol %, of other fluorinated ethylenically unsaturated monomers (e.g. $C_3$-$C_8$ perfluoroolefins, perfluoroalkylvinylethers) may however be present in the fluorinated ion exchange polymer of the invention without deviating from the scope of the invention.

The chlorofluoroolefin is preferably chlorotrifluoroethylene (CTFE).

In the fluorinated functional monomer of formula $CF_2\!\!=\!\!CF\!\!-\!\!O\!\!-\!\!(CF_2CF(CF_3)O)_m\!\!-\!\!(CF_2)_nSO_2X$ when m equals 1, n is an integer from 0 to 10, preferably from 0 to 6. Preferably, when m equals 1, n equals 2 and the fluorinated functional monomer has formula $CF_2\!\!=\!\!CF\!\!-\!\!O\!\!-\!\!(CF_2CF(CF_3)O)\!\!-\!\!(CF_2)_2SO_2X$ (perfluoro-2-(2-fluorosulfonylethoxy)propylvinyl ether).

When m is 0, n is an integer from 0 to 10, preferably from 2 to 6, more preferably from 2 to 4. More preferably when m is 0 n is 2 and the fluorinated functional monomer is perfuoro-5-sulphonylfluoride-3-oxa-1-pentene of formula $CF_2\!\!=\!\!CF\!\!-\!\!O\!\!-\!\!(CF_2)_2SO_2X$.

In a preferred embodiment of the invention the fluorinated ion exchange polymer consists of from 40 mol % to 94 mol %, preferably from 50 mol % to 94 mol %, even more preferably 55 mol % to 92 mol % of recurring units derived from CTFE and from 6 mol % to 60 mol %, preferably from 6 mol % to 50 mol %, more preferably from 8 mol % to 45 mol % of recurring units derived from $CF_2\!\!=\!\!CF\!\!-\!\!O\!\!-\!\!(CF_2)_nSO_2X$. More preferably the fluorinated functional monomer is $CF_2\!\!=\!\!CF\!\!-\!\!O\!\!-\!\!(CF_2)_2SO_2X$. An amount of recurring units derived from $CF_2\!\!=\!\!CF\!\!-\!\!O\!\!-\!\!(CF_2)_2SO_2X$ of from 6 to 35 mol % has been found to be quite advantageous for the preparation of proton exchange membranes.

In the fluorinated ion exchange polymer, X is preferably selected among F, $-O^-M^+$, wherein $M^+$ is a cation selected among $H^+$, $NH_4^+$, $K^+$, $Li^+$, $Na^+$, or mixtures thereof. More preferably X is selected among F, $-O^-M^+$, wherein $M^+$ is a cation selected among $H^+$, $NH_4^+$, $K^+$, $Na^+$.

The fluorinated ion exchange polymer may be conveniently prepared by polymerizing the chlorofluoroolefin and the fluorinated functional monomer in the presence of a free radical initiator. Typically the polymerization process is carried out in a dispersed phase. In such a polymerization process formation of an emulsion containing water, a surfactant and the fluorinated functional monomer of formula $CF_2\!\!=\!\!CF\!\!-\!\!O\!\!-\!\!(CF_2CF(CF_3)O)_m\!\!-\!\!(CF_2)_nSO_2X$, wherein X is typically selected among the halogens (F, Cl, Br, I), preferably fluorine, at the polymerization temperature is placed in a reaction vessel; the chlorofluoroolefin is fed to said emulsion and the polymerization reaction is then started by addition of a free radical initiator; the chlorofluoroolefin is typically fed for a period of time until the end of the polymerization process. A polymerization latex comprising the fluorinated ion exchange polymer dispersed in an aqueous liquid phase is obtained at the end of the process. The fluorinated ion exchange polymer can be recovered from said polymerization latex using well-known techniques, such as a freeze-thawing coagulation method.

The coagulated polymer may then be subjected to conventional post-treatment and pelletization procedures. For instance, the polymer may be subjected to a fluorination treatment to remove unstable chain-end groups as known in the art.

The fluorinated ion exchange polymer can be obtained in its salified form, wherein X is $-O^-M^+$ and $M^+$ is a cation selected among $NH_4^+$, $K^+$, $Li^+$, $Na^+$, or their mixtures, by treatment of the polymer obtained from the polymerization process with a strong base (e.g. NaOH, KOH) according to known methods.

The fluorinated ion exchange polymer can be obtained in its acid form, wherein X is $-O^-M^-$ and $M^+$ is $H^+$, by treatment of the corresponding salified form of the polymer with a concentrated acid solution.

The liquid composition of the invention is prepared by a dissolution process comprising the steps of: providing the fluorinated ion exchange polymer as detailed above; and contacting said polymer with an aprotic organic solvent at a temperature of at least 20° C. The process is carried out under stirring at a temperature of at least 50° C., preferably of at least 60° C., more preferably of at least 70° C. The temperature does not typically exceed 200° C., preferably it does not exceed 180° C., even more preferably it does not exceed 160° C.

The expression "dissolution process" is used herein to refer to a process for the preparation of a liquid composition comprising the fluorinated ion exchange polymer in dissolved or in dispersed form.

The process is advantageously carried out at atmospheric pressure, without the need to employ pressurized vessels.

The Applicant has surprisingly found that regardless of the mild conditions of pressure and temperature used in the dissolution process, liquid compositions comprising at least 10 wt % of the fluorinated ion exchange polymer in an aprotic organic solvent can be obtained which can be used for the preparation of ion exchange membranes.

Preferably, the liquid composition comprises at least one polar aprotic solvent and the fluorinated ion exchange polymer is in its salified or acid form; more preferably the fluorinated ion exchange polymer in its acid form.

The liquid compositions of the invention are particularly suitable for the preparation of ion exchange membranes. Accordingly, the invention further relates to a process for the preparation of ion exchange membranes using the liquid composition as above detailed.

The ion exchange membranes may be prepared using any conventional method known in the art, such as by casting, coating, e.g. roller coating, gravure coating, reverse roll coating, dip coating, spray coating and the like. Composite ion exchange membranes, comprising a reinforcing support, preferably a porous support, in addition to the fluorinated ion exchange polymer, may also be prepared using the liquid composition as above detailed with an impregnation process.

Such an impregnation process comprises the step of impregnating a porous support with the liquid composition of the invention.

The choice of the porous support is not particularly limited. Porous supports which are generally inert under final composite membranes operating conditions will be selected.

Among porous inert materials capable to provide the composite membranes with suitable mechanical properties mention can be made of woven or non-woven polyolefin membranes, in particular polyethylene membranes, and fluoropolymer porous supports. Porous supports of fluoropolymers are generally preferred because of their high chemical inertia.

Biaxially expanded PTFE porous supports (otherwise known as ePTFE membranes) are among preferred supports. These support are notably commercially available under trade names GORE-TEX®, TETRATEX®.

The process of the invention may comprise one or more than one impregnating step(s) in which the porous support is contacted with the liquid composition of the invention.

The process typically comprises at least one drying step and/or at least one annealing step.

The drying step is typically intended to remove excess liquid medium from impregnated support. This step is generally carried out at a temperature of typically 20 to 100° C., preferably from 25 to 90° C., more preferably from 30 to 80° C. A flow of air or of inert gas (e.g. nitrogen) is generally contacted with the impregnated support during this step.

Should the process comprise multiple impregnating steps, it is generally understood that each of them is followed by a drying step before the porous support is again contacted with the liquid composition as above detailed for a further impregnating step.

The annealing step, typically conceived for consolidating the impregnated porous support, is generally carried out at a temperature of at least 120° C., preferably of at least 150° C., more preferably of at least 180° C. Maximum temperature is not particularly limited, provided that the porous support and the fluorinated ion exchange polymer remain stable under these conditions. It is thus generally understood that the annealing step is carried out at a temperature not exceeding 270° C., preferably not exceeding 250° C., more preferably not exceeding 220° C. The process of the invention typically comprises only one annealing step, which is generally carried out once completed (all) impregnating/drying sequence(s).

Should the liquid composition also comprise a bis-olefin and a radical initiator, cross-linking of the fluorinated ion exchange polymer may conveniently be carried out at the same time as the annealing step.

The Applicant has surprisingly found that by using the liquid composition of the invention, comprising the fluorinated ion exchange polymer in an amount of at least 5 wt %, with respect to the total weight of the liquid composition, it is advantageously possible to obtain composite membranes having an even distribution of the fluorinated ion exchange polymer through the entire thickness of the resulting membrane, with a simple single-step impregnation procedure.

Said impregnation step can be carried out by immersion of the porous support into an impregnation vessel comprising the liquid composition or can be performed by applying suitable amounts of the same by well-known coating techniques such as casting, coating, spraying, brushing and the like, either simultaneously on each side of the porous support or in subsequent coating steps. It is nevertheless generally understood that impregnation by immersion in a vessel comprising the liquid composition is the technique having provided best results.

The impregnation process is preferably a continuous process.

The ion exchange membrane can be further submitted to additional steps, including for instance, rinsing steps for removal of organic pollutants, and the like.

When the liquid composition used in the process comprises the fluorinated ion exchange polymer as above defined in its acid or salified form, no activation treatment is required at the end of the manufacturing process to obtain a membrane directly usable as an ion exchange membrane. When the fluorinated ion exchange polymer as above defined is in its acid form, the obtained membranes are directly usable as proton exchange membranes for fuel cell applications.

When the liquid composition used in the process comprises the fluorinated ion exchange polymer as above defined in its neutral form, an activation treatment, such as that described for the fluorinated ion exchange polymer, is generally required at the end of the manufacturing process to obtain a membrane that can be used as ion exchange membrane.

The ion exchange membranes obtained from the liquid composition of the invention are a further object of the invention.

Thus, the invention is also directed to an ion exchange membrane comprising a fluorinated ion exchange polymer as above defined.

In a preferred embodiment, the ion exchange membrane comprises:
a porous support (as above detailed); and,
a fluorinated ion exchange polymer as above defined impregnated on the support.

The fluorinated ion exchange polymer may be in its neutral, salified or acid form. Preferably the fluorinated ion exchange polymer is in its acid form.

The ion exchange membranes of the invention, in particular composite membranes, are useful as proton exchange membranes in fuel cell applications. The Applicant has found that said ion exchange membranes are provided with a higher stability under the conditions of use of the fuel cell with respect to membranes obtained using fluorinated ion exchange polymers comprising recurring units deriving from tetrafluoroethylene, as shown by the appended examples. Such an increase in stability is quite unexpected: the lower energy of the carbon-chlorine bonds in the membranes of the present invention with respect to the carbon-fluorine bonds in the membranes based on ion exchange polymers comprising tetrafluoroethylene would have suggested a lower stability of the inventive membranes.

In addition to the use for the preparation of ion exchange membranes the liquid composition of the invention may be advantageously employed also for the preparation of so-called "catalytic inks" which are used to build up electrode layers onto the surface of a ion conducting membrane for use in a fuel cell. Such catalytic inks, in addition to the liquid composition comprising the fluorinated ion exchange polymer as described above, comprise catalyst particles. Typical catalyst particles comprise an active compound selected among metals like platinum, ruthenium, gold, palladium, rhodium, iridium; their electro conductive oxides and alloys. The active compound is generally supported on a suitable material, herein called "carrier", which is preferably electrically conductive. The carrier is advantageously chosen from carbon powder, for instance carbon black.

The amount of catalyst particles (including the carrier, if any) in the catalytic ink is generally of at least 1 wt % based on the total weight of the catalytic ink. Preferably, it is of at least 3 wt % and more preferably of at least 5 wt %. The amount of catalyst particles (including the carrier, if any) in the catalytic ink is advantageously of at most 50 wt % based on the total weight of the catalytic ink, preferably of at most 40 wt % and more preferably of at most 30 wt %.

Catalyst inks comprising the liquid composition of the invention can be used for the preparation of electrocatalytic layers. The electrocatalytic layers may for instance be prepared by screen printing or solution coating the catalyst ink on the surface of an ion exchange membrane. The ion exchange membrane may comprise the fluorinated ion exchange polymer of the invention, having the same or different molar composition, or it may comprise a different ion exchange polymer.

Thus, an additional object of the present invention is an assembly comprising an ion exchange membrane having first and second surface and a first electrocatalytic layer adhered to said first surface and a second electrocatalytic layer adhered to said second surface, wherein at least one of said ion exchange membrane, first or second electrocatalytic layers comprise a fluorinated ion exchange polymer as defined above.

The invention will be now described in more detail with reference to the following examples, whose purpose is merely illustrative and not intended to limit the scope of the invention.

Should the disclosure of any patents, patent applications, and publications which are incorporated herein by reference conflict with the description of the present application to the extent that it may render a term unclear, the present description shall take precedence.

EXAMPLES

Example 1

In a 5 liter autoclave, the following reactants were introduced: 100 g of a perfluoropolyoxyalkylene microemulsion previously obtained by mixing: 35 g of a perfluoropolyoxyalkylene of formula $CF_2ClO(CF_2CF(CF_3)O)_p(CF_2O)_q$-$CF_2COOK$ (p/q=10, average molecular weight 527 g/mol); 25 g of a perfluoropolyether oil Galden® D02 (supplied by Solvay Solexis SpA); 40 g of demineralized water; 2.5 liter of demineralized water; 600 g of $CF_2=CF$—O—$(CF_2)_2$—$SO_2F$ and 425 g of CTFE.

The autoclave, stirred at 600 rpm, was heated up to 50° C. Total pressure at the reaction temperature was 7.7 absolute atm. 130 ml of an aqueous solution having a concentration of 50 g/l of potassium persulphate were then fed into the autoclave to initiate the reaction. The pressure was maintained at 7.7 absolute atm by introducing liquid CTFE from a cylinder. At the end of the reaction a total of 174 g of CTFE were introduced. Reaction was stopped after 293 minutes from the start. The reactor was heated up at 70° C. for 30 minutes during which the gas phase was vented and then it was cooled down to room temperature.

The produced latex had a solid content of 16.5% by weight. The polymer latex was coagulated by freezing and thawing and the recovered polymer was washed with water and dried for 40 hours at 80° C.

The polymer composition was determined by NMR analysis and is reported in Table 1.

Examples 2-5

Ion exchange polymers comprising different amounts of CTFE and of $CF_2=CF$—O—$(CF_2)_2$—$SO_2F$ were prepared following the same procedure of Example 1. Their composition is reported in Table 1.

TABLE 1

| Example | CTFE (mol %) | $CF_2=CF$—O—$(CF_2)_2$—$SO_2F$ (mol %) |
|---|---|---|
| 1 | 93.3 | 6.7 |
| 2 | 91.9 | 8.1 |
| 3 | 88.1 | 11.9 |
| 4 | 86.0 | 14.0 |
| 5 | 82.3 | 17.7 |

Comparative Example 1—Copolymer of Tetrafluoroethylene (TFE) and $CF_2=CF$—O—$CF_2C_2$—$SO_2F$ In a 22 liters autoclave the following reagents were charged: 11.5 liters of demineralized water; 980 g of $CF_2=CF$—O—$CF_2CF_2$—$SO_2F$, 3100 g of a 5% weight solution of $CF_2ClO(CF_2CF(CF_3)O)_n(CF_2O)_mCF_2COOK$ in water (average molecular weight of 521 and n/m=10).

The autoclave, stirred at 470 rpm, was heated to a temperature of 60° C. and 150 ml of a water based solution of potassium persulfate (6 g/l) were added to start the reaction. The pressure was maintained at a value of 11.5 Bar abs by inserting TFE. After an initial addition of 1200 g of TFE, 220 g of the monomer $CF_2=CF$—O—$CF_2CF_2$—$SO_2F$ were added every 200 g of TFE fed to the autoclave. The reaction was stopped after 296 min by stopping the stirring, cooling the autoclave and reducing the internal pressure by venting the TFE; a total of 4000 g of TFE were fed.

The produced latex was kept under nitrogen bubbling for 16 hours to strip away residual monomers, then the polymer was coagulated by freezing and thawing and washed with water and dried for 40 h at 150° C.

The polymer contains 16.5 mol % $CF_2=CF$—O—$CF_2CF_2$—$SO_2F$ and 83.5 mol % TFE.

Example 6: Preparation of Liquid Compositions of Polymers of Examples 1-5 and of Comparative Example 1 in —$SO_2F$ Form About 15 mg of each of the polymers of Examples 1 to 5 were dissolved in 0.6 ml of $C_6F_6$ at 70° C. providing a clear solution without any residual solid, that was used for the $^{19}F$-NMR characterization of the polymers.

The same amount of the polymer of Comparative Example 1 was stirred in 0.6 ml of $C_6F_6$ at 70° C. without dissolution of the polymer as indicated by the constant presence of visible solid even after several hours of stirring.

Example 7: General Procedure for the Transformation of the Polymers of Examples 1-5 and of Comparative Example 1 into Their Acid (—$SO_3H$) Form 50 g of each of the polymers of Examples 1-5 and of Comparative Example 1 were suspended in a solution of $KOH/H_2O$ 10 w/w % (300 g), the resulting mixture was heated at 90° C. under vigorous stirring for 8 h. The powder was then filtered off and carefully washed with deionized water until reaching neutrality of the washing water. The powder thus obtained was then suspended at room temperature in a $HNO_3/H_2O$ 20 w/w % solution (300 ml) for 2 h under stirring. After extensive washing in deionized water (until reaching pH 7 of the washing water) the powder was dried in a vacuum oven at 80° C. for 16 h.

Example 8: Preparation of Liquid Compositions Comprising Polymers of Examples 1-5 and of Comparative Example 1 in Acid Form 20 g of each of the polymers of Examples 1-5 in acid form were added portionwise to N-ethyl-2-pyrrolidone (80 g) under stirring at 100° C. After 2 hours the mixture was cooled down to room temperature providing liquid compositions with no traces of residual solids comprising 20 wt % polymer.

Acetone was added to each of the liquid compositions thus obtained to regulate the viscosity and surface tension of the composition to facilitate the preparation of a composite membrane. The final liquid compositions are reported in Table 2.

TABLE 2

| Polymer | Liquid Composition | Concentration (wt % polymer/ total liquid composition) | Viscosity at 100 sec$^{-1}$ (Cpoise) |
|---|---|---|---|
| Ex. 1 | LC 1 | 6 | — |
| Ex. 2 | LC 2 | 6.5 | 70 |
| Ex. 3 | LC 3 | 13 | — |
| Ex. 4 | LC 4 | 13 | 40 |
| Ex. 5 | LC 5 | 12.5 | — |

Example 9: Preparation of a Liquid Composition Comprising the Polymer of Comparative Example 1 in Acid Form 20 g of the polymer of Comp. Example 1 in acid form were added portionwise to N-ethyl-2-pyrrolidone (80 g) under stirring at 100° C. Even after several hours of stirring undissolved solid never disappeared and a liquid composition could not be obtained that could be used for the preparation of a composite membrane. In order to obtain a suitable liquid composition for the preparation of a composite membrane the polymer of Comp. Example 1 was treated in autoclave at 250° C. with water for 3 hours. A liquid composition containing 21 wt % of dissolved polymer was thus obtained. Iso-propyl alcohol was added to the liquid composition in order to obtain a 15 wt % concentration of polymer in a water-iso propyl alcohol mixture (Comparative LC 1).

Example 10: Composite Membrane Preparation

An expanded PTFE thin film (TETRATEX® #3107 from Donaldson) was flanged on a frame and impregnated using 20 ml of each liquid composition LC1-LC 5 and Comparative LC1 for each side. The specimen was placed in a vent oven and heated at 65° C. for 1 h, then 90° C. for 1 h and then annealed at 190° C. for 1 h. Completely transparent membranes having a thickness of 25 micron was obtained in all cases.

Example 11: Testing of the Membranes Obtained in Example 10 in a Fuel Cell

The composite membranes obtained in Example 10 were assembled in a 25 cm$^2$ cell with LT250EW gas diffusion electrodes and conditioned for 24 hours at 75° C., 100% reactants humidification (air on cathode side and pure hydrogen on anode side) by keeping constant voltage of 0.6 V by an electronic load. No back pressure applied to the reactants.

After the conditioning the cell resistance was measured by impedance spectroscopy; it corresponds to the real component of the impedance curve when the imaginary component is measured as zero. The measure was carried out under the same operating conditions as the conditioning phase. The values are shown in Table 3.

After the measure of the cell resistance the electronic load was disconnected and the cathode side feed was changed to nitrogen (with 100% humidification), back pressure was zero on both anode and cathode side. By using a potentiostat a cell voltage of 0.42 V was imposed to the cell and the oxidation current on the cathode side was measured (thus quantifying the amount of hydrogen that crosses the membrane from anode side). The hydrogen-crossover is measured in terms of current; the current density values are reported in Table 3.

TABLE 3

| Polymer | Cell Resistance (mOhm · cm$^2$) | H$_2$ crossover current (mA/cm$^2$) |
|---|---|---|
| Ex. 1 | 87 | 0.20 |
| Ex. 2 | 62 | 0.22 |
| Ex. 3 | 53 | 0.24 |
| Ex. 4 | 48 | 0.36 |
| Ex. 5 | 45 | 0.41 |
| Comp. Ex. 1 | 52 | 1.4 |

Thus, with respect to the membrane prepared with the polymer of Comparative Example 1 the inventive membranes allow a much lower passage of hydrogen (the thickness of the membranes being the same).

The membranes obtained from the polymers of Example 2 and of Comparative Example 1 were further used for a cell durability evaluation under the following operating conditions:

Cell temperature: 90° C.
Cathode side reactant: pure oxygen, inlet relative humidity 30%. No back pressure.
Anode side reactant: pure hydrogen, inlet relative humidity 30%. No back pressure.

Cell voltage was maintained in open circuit voltage (OCV), so to drain zero current from the cell, the voltage was monitored during the test and the end-of-life criteria was fixed to 0.7 V which is recognized in the art as corresponding to a very high level of gas crossover, that is to the irreversible damage of the membrane.

The composite membrane comprising the polymer of Comp. Example 1 reached the set limit of 0.7 V after 230 hours of test.

The test of the composite membrane comprising the polymer of Example 2 was arbitrarily stopped after 500 hours when the voltage was still above 0.8 V.

The test shows the higher resistance of the inventive membrane with respect to the comparative one under high oxidizing operating conditions.

The invention claimed is:

1. A liquid composition comprising:
at least one aprotic organic solvent; and
at least one fluorinated ion exchange polymer dissolved or dispersed in said at least one aprotic organic solvent, said fluorinated ion exchange polymer consisting of: 55 to 92 mol % of recurring units derived from a chlorofluoroolefin of formula $CF_2$=$CClY$, wherein Y is either F or Cl, and from 6 to 60 mol % of recurring units derived from at least one functional monomer of formula $CF_2$=$CF$—$O$—$(CF_2CF(CF_3)O)_m$—$(CF_2)_n$ $SO_2X$, wherein m is an integer equal to 0 or 1, n is an integer from 0 to 10 and X is selected from the group consisting of halogens and —$O^-M^+$, wherein $M^+$ is a cation selected from the group consisting of $H^+$, $NH_4^+$, $K^+$, $Li^+$, $Na^+$, and mixtures thereof.

2. The liquid composition according to claim 1 wherein, when X is —$O^-M^+$, and $M^+$ is a cation selected from the group consisting of $H^+$, $NH_4^+$, $K^+$, $Li^+$, $Na^+$, and mixtures thereof, wherein the aprotic organic solvent is a polar aprotic organic solvent.

3. The liquid composition according to claim 1, wherein X is selected from the group consisting of F, Cl, Br, and I, and wherein the aprotic organic solvent is an apolar aprotic organic solvent.

4. The liquid composition according to claim 1, wherein said aprotic organic solvent has a boiling temperature of at least 50° C.

5. The liquid composition according to claim 1, wherein the fluorinated ion exchange polymer is present in an amount of at least 5 wt % with respect to the total weight of the liquid composition.

6. The liquid composition according to claim 1 further comprising catalyst particles.

7. The liquid composition according to claim 1, wherein the chlorofluoroolefin is $CF_2$=CClF.

8. The liquid composition according to claim 1, wherein the at least one functional monomer is selected from monomers of formula $CF_2$=CF—O—$(CF_2)_n$—$SO_2$X, wherein n is an integer from 0 to 10.

9. A process for preparing the liquid composition of claim 1, said process comprising dissolving a fluorinated ion exchange polymer consisting of 55 to 92 mol % of recurring units derived from a chlorofluoroolefin of formula of $CF_2$=CClY, wherein Y is either F or Cl, and from 6 to 60 mole % of recurring units derived from at least one functional monomer of formula $CF_2$=CF—O—$(CF_2CF(CF_3)O)_m$—$(CF_2)_n SO_2 X$, wherein m is an integer equal to 0 or 1, n is an integer from 0 to 10 and X is selected from the group consisting of halogens, —O$^-$M$^+$, wherein M$^+$ is a cation selected from the group consisting of H$^+$, NH$_4^+$, K$^+$, Li$^+$, Na$^+$, and mixtures thereof in an aprotic organic solvent at atmospheric pressure.

10. A process for manufacturing an ion exchange membrane, the process comprising casting or coating the liquid composition of claim 1.

11. An ion exchange membrane obtained by the process of claim 10.

12. The process of claim 10, wherein the casting or coating comprises impregnating a porous support with the liquid composition.

13. A process for manufacturing an electrocatalytic layer comprising printing or coating the liquid composition of claim 6.

14. The liquid composition according to claim 8, wherein n is an integer from 2 to 6.

15. The liquid composition according to claim 1, wherein X is —O-M$^+$ and M$^+$ is selected from H$^+$, NH$_4^+$, K$^+$ and Na$^+$.

16. The liquid composition according to claim 1, wherein X is a halogen selected from Cl, F, Br, and I.

* * * * *